(12) United States Patent
Kishimoto et al.

(10) Patent No.: US 7,426,517 B2
(45) Date of Patent: Sep. 16, 2008

(54) STORAGE MANAGING METHOD AND ITS DEVICE

(75) Inventors: Toshimichi Kishimoto, Hadano (JP); Shuichi Yagi, Matsuda (JP)

(73) Assignee: Hitachi, Ltd., Tokyo (JP)

( * ) Notice: Subject to any disclaimer, the term of this patent is extended or adjusted under 35 U.S.C. 154(b) by 499 days.

(21) Appl. No.: 10/790,837

(22) Filed: Mar. 3, 2004

(65) Prior Publication Data

US 2005/0108245 A1 May 19, 2005

(30) Foreign Application Priority Data

Nov. 19, 2003 (JP) ............................. 2003-388702

(51) Int. Cl.
*G06F 7/00* (2006.01)
*G06F 17/00* (2006.01)
(52) U.S. Cl. ......................................... 707/100; 707/10
(58) Field of Classification Search .................... 707/10, 707/100, 2; 709/201
See application file for complete search history.

(56) References Cited

U.S. PATENT DOCUMENTS

| 5,392,398 | A | | 2/1995 | Meyer | |
|---|---|---|---|---|---|
| 5,873,085 | A | * | 2/1999 | Enoki et al. .................... | 707/10 |
| 6,378,050 | B1 | * | 4/2002 | Tsuruta et al. ............... | 711/149 |
| 6,640,278 | B1 | * | 10/2003 | Nolan et al. .................... | 711/6 |
| 6,772,209 | B1 | | 8/2004 | Chernock et al. | |
| 2001/0056459 | A1 | * | 12/2001 | Kurose et al. ............... | 709/201 |
| 2002/0161880 | A1 | | 10/2002 | Kishimoto et al. | |
| 2003/0061331 | A1 | * | 3/2003 | Nakamura et al. .......... | 709/223 |
| 2003/0065902 | A1 | | 4/2003 | Shiga et al. | |
| 2003/0115347 | A1 | | 6/2003 | Wolrich et al. | |
| 2003/0167327 | A1 | | 9/2003 | Baldwin et al. | |
| 2003/0229645 | A1 | | 12/2003 | Mogi et al. | |
| 2004/0078461 | A1 | | 4/2004 | Bendich et al. | |
| 2004/0078583 | A1 | | 4/2004 | Kishimoto et al. | |
| 2004/0128363 | A1 | | 7/2004 | Yamagami et al. | |

FOREIGN PATENT DOCUMENTS

| JP | 11-164283 | 6/1999 |
|---|---|---|
| JP | 2003108412 | 4/2003 |
| JP | 2003108420 | 4/2003 |

* cited by examiner

*Primary Examiner*—Hung T Vy
(74) *Attorney, Agent, or Firm*—Mattingly, Stanger, Malur & Brundidge, P.C.

(57) ABSTRACT

The time (response time) from the issue of a display request for the display of constructional information to the obtaining of predetermined desirable constructional information and the completion of display is long when a terminal device having (a graphical user interface) to manage and control the operation of a storage system by using a storage managing server is used. To reduce response time, the storage managing server receives a first request issued from a storage managing terminal for executing the processing of the storage managing server, and a second request for executing processing including the communication of constructional information of a storage device between the storage device and the storage managing server. The storage managing server starts processing with respect to the second request before the storage managing server transmits a response to the first request to the storage managing terminal.

14 Claims, 9 Drawing Sheets

FIG. 2

| 510 | VOLUME INFORMATION | No.1 | Address A | Capacity X | ---------------- |
| --- | --- | --- | --- | --- | --- |
| | | No.2 | Address B | Capacity Y | ---------------- |
| | | No.3 | Address C | Capacity Z | ---------------- |
| | | ⋮ | ⋮ | ⋮ | ---------------- |

| 520 | BREAKDOWN INFORMATION | Volume No.1 | 0 | ---------------- |
| --- | --- | --- | --- | --- |
| | | Volume No.2 | 1 | ---------------- |
| | | Volume No.3 | 0 | ---------------- |
| | | ⋮ | ⋮ | ---------------- |

| 530 | PERFORMANCE INFORMATION | Path No.1 | ○○ bps | ---------------- |
| --- | --- | --- | --- | --- |
| | | Path No.2 | ○○ bps | ---------------- |
| | | Path No.3 | ○○ bps | ---------------- |
| | | ⋮ | ⋮ | ---------------- |

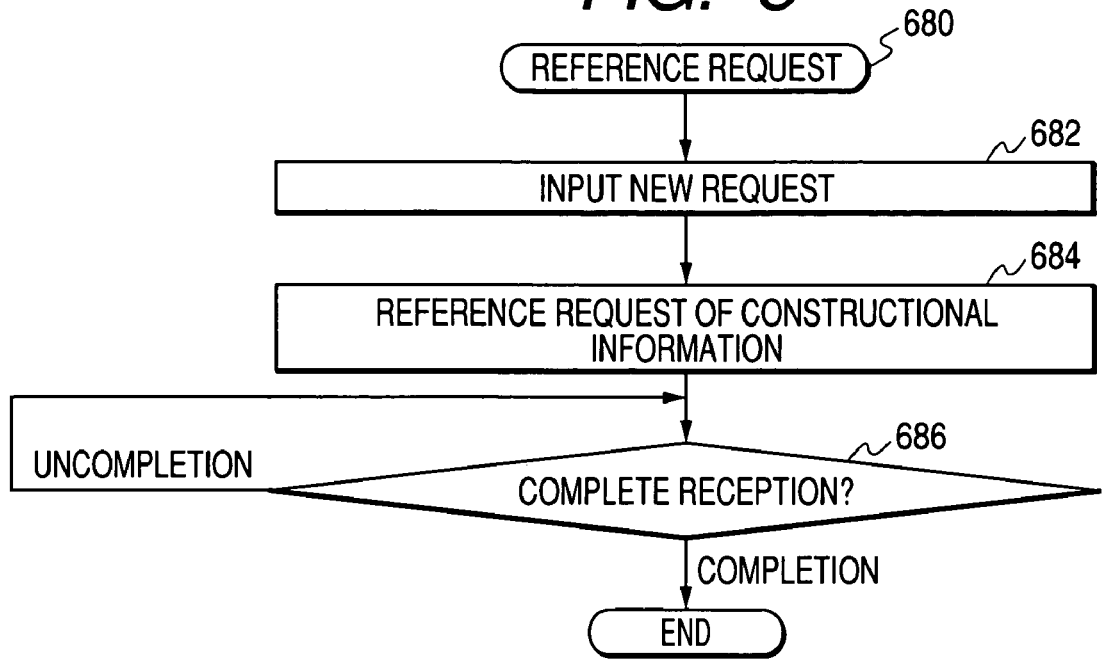
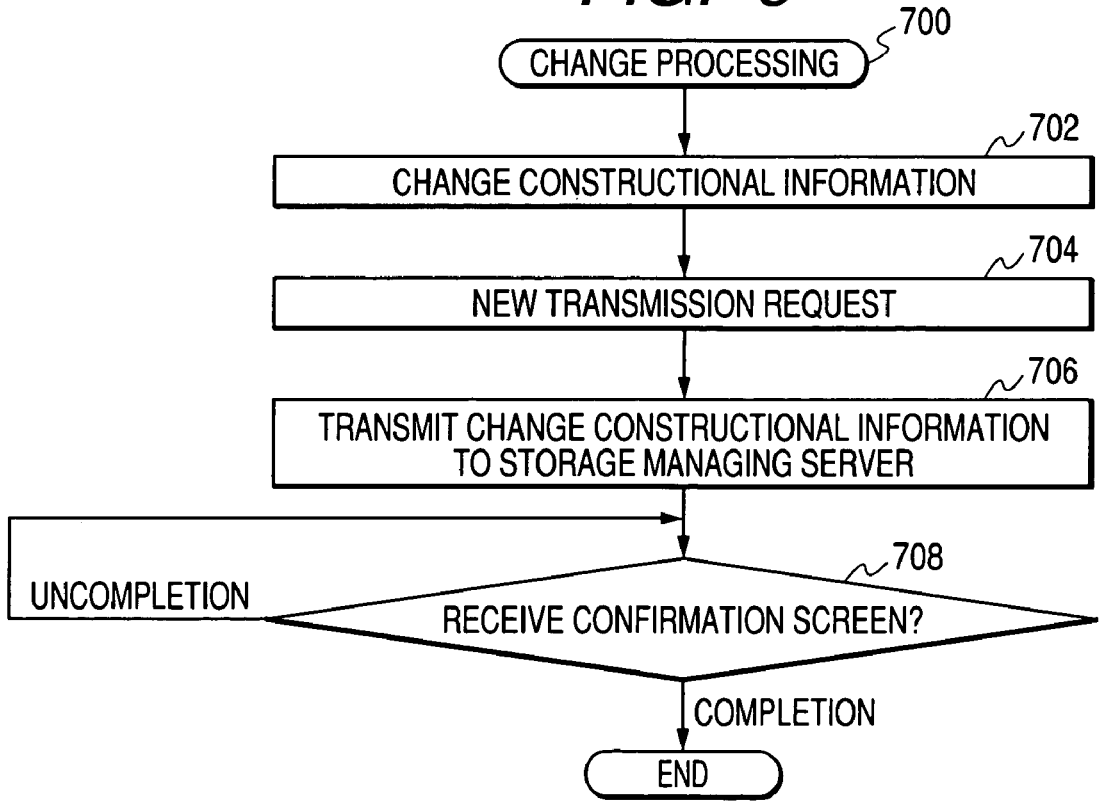

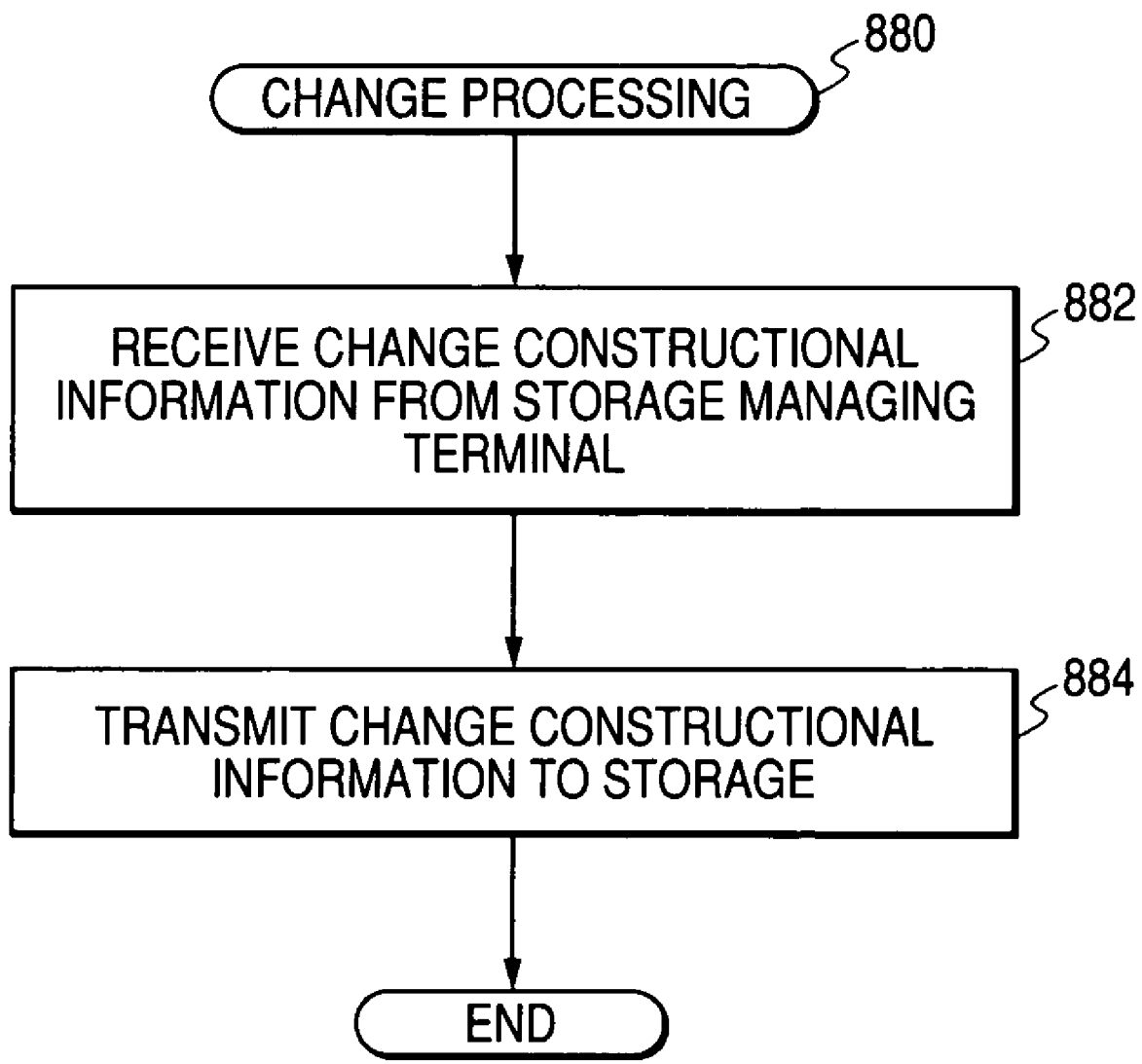

STORAGE MANAGING METHOD AND ITS DEVICE

CROSS-REFERENCES TO RELATED APPLICATIONS

This application relates to and claims priority from Japanese Patent Application No. 2003-388702, filed on Nov. 19, 2003, the entire disclosure of which is incorporated herein by reference.

BACKGROUND OF THE INVENTION

The present invention relates to a method of managing a storage system and its managing device, and, more particularly, the invention relates to a method of effecting transfer of constructional information between the storage system and a storage managing server.

As described in JP-A-2003-108420 (patent literature 1), a storage managing server is connected to a storage system through a LAN (local area network) to manage and control the constructional information of the storage system. The management and control of the storage system is executed by referring to this constructional information, which is received from the storage managing server, and by changing the constructional information.

There is also information which is independently updated in the storage system, such as performance information and breakdown information of the storage system, in addition to information that is set and changed from the storage managing server, such as the capacity of the storage system, setting information of a path, etc., to facilitate the control of the storage system using the storage managing server. Accordingly, the constructional information stored in the storage managing server is not necessarily the same as the constructional information of the storage system.

Therefore, it is necessary to update the constructional information stored in the storage managing server. In the technical literature 1, the constructional information sent from the storage system to the storage managing server is transferred on the basis of a constructional information obtaining request received from a storage system manager (person).

JP-A-2003-108412 (patent literature 2) discloses a technique for transferring only update information that is updated within the constructional information of the storage system from the storage system to the storage managing server in response to a change in the constructional information of the storage system.

[Patent literature 1]JP-A-2003-108420
[Patent literature 2]JP-A-2003-108412

A terminal device having a GUI (graphical user interface) is connected to the storage managing server to allow the system manager to manage and control the operation of the storage system by using the storage managing server. When the terminal device is seen from the storage system manager using the terminal device, the length of time (response time) from the transmission of a display request of the constructional information to the completion of display of predetermined desirable constructional information becomes a factor relating to the operability of the terminal device.

This factor depends on the amount of constructional information, more specifically, the amount to be updated with respect to the constructional information stored in the storage managing server. Namely, the time required for transfer time of the constructional information from the storage system to the storage managing server has an influence on the response time of the terminal device. Such a factor is not considered in the patent literature 1.

The patent literature 2 discloses a technique for transferring only the updated constructional information to the storage managing server with the generation of the update of the constructional information within the storage system as an opportunity, with the object of shortening of the transfer time. However, the constructional information also includes information momentarily changed, such as the performance information of the storage system. Such information momentarily changed is not considered in the patent literature 2. When the technique disclosed in the patent literature 2 is applied, the constructional information from the storage system to the storage managing server is continuously transferred.

A processor for transferring the constructional information within the storage system typically will also be used in another processing, and the LAN between the storage system and the storage managing server is also used in another information transfer, which deteriorates the performance of the entire system.

SUMMARY OF THE INVENTION

An object of the present invention is to improve the speed relating to the display of constructional information for use by a user of the terminal device.

One mode of the present invention has the following construction to achieve the above-stated object.

In the processing method of a storage managing server in accordance with the present invention, the storage managing server receives a first request issued from a storage managing terminal for executing the processing of the storage managing server, and it receives a second request for executing processing, including the communication of constructional information of a storage device between the storage device and the storage managing server. Processing with respect to the second request is started before a response to this first request is transmitted to the storage managing terminal.

For example, the first request is a login request made entered through the storage managing terminal, and the second request is a transmission request for transmission of the constructional information. In one example, the transmission request of the constructional information is issued to the storage, if necessary, before the downloading of a manager program as processing of the storage managing server with respect to the login request.

In accordance with the present invention, the second request is made together with the first request on the screen by operating the storage managing terminal, and a signal can be transmitted to the storage managing server. Thus, the time (response time) from the completion of processing with respect to the first request to the display of results of processing with respect to the second request in the storage managing terminal can be shortened by executing processing, including the communication of the constructional information, if necessary, with respect to the second request, before the storage managing server starts processing with respect to the first request.

BRIEF DESCRIPTION OF THE DRAWINGS

FIG. 2 is a diagram showing one example of constructional information.

FIG. 8 is a flow chart of reference processing as one example of the processing in FIG. 7.

FIG. 9 is a flow chart of change processing in FIG. 7.

FIG. 11 is a flow chart showing change processing in FIG. 10.

DESCRIPTION OF THE PREFERRED EMBODIMENTS

Figure 1:
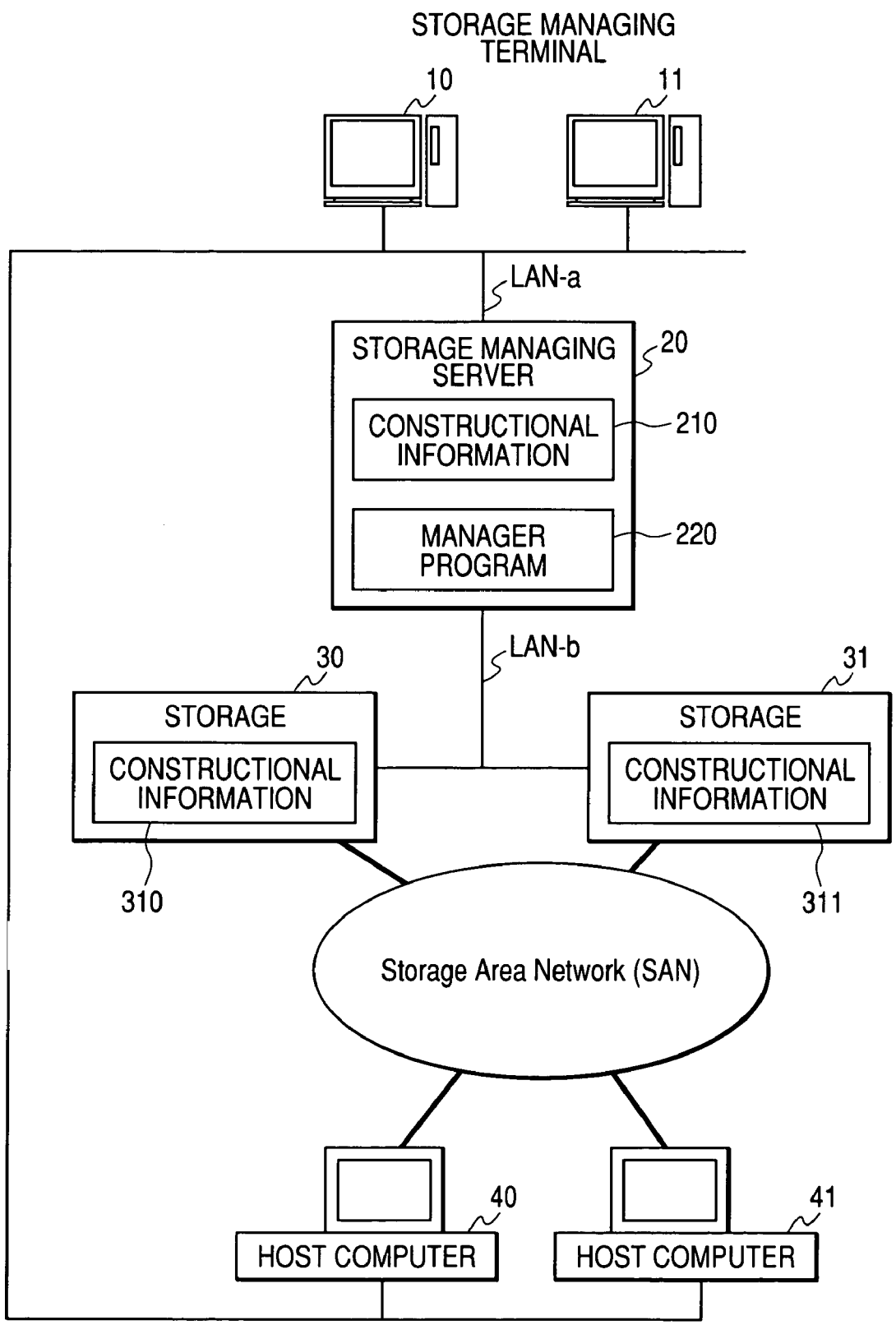
FIG. 1 is a block diagram of a storage managing system.

An embodiment of the present invention will be described with reference to the drawings. FIG. 1 is a diagram showing the construction of a storage managing system. In FIG. 1, storages 30, 31, - - - (hereinafter designated in general as 30) are connected to a storage managing server 20 under the environment of a SAN (Storage Area Network) in which the storages 30 and host computers 40, 41, - - - (hereinafter designated in general as 40) are connected. Plural storage managing dedicated terminals 10, 11, - - - (hereinafter designated in general as 10) are connected to the storage managing server 20 through a LAN-a (Local Area Network). The storage managing terminal 10 is arranged to perform the operations of reference, setting, change, etc. of constructional information through the storage managing server 20. Constructional information 310, 311, - - - (hereinafter designated in general as 310) within the storages 30, 31 is constructional information of the respective storages 30, 31. Both the constructional information 310 and the constructional information 311 are stored to the storage managing server 20 as constructional information 210. The constructional information 210 that is stored to the storage managing server 20 is not necessarily the same as the constructional information 310, 311 of the storages 30, 31. This point will be described in more detail later.

A manager program 220 for processing the constructional information 310 of the storage 30 is stored in the storage managing server 20. The manager program 220 includes a manager program for a terminal operated by the storage managing terminal 10, and a manager program for a storage managing server operated by the storage managing server 20. The manager program for a terminal is downloaded from the storage managing server 20 to the storage managing terminal 10 through the LAN-a in accordance with a download request from the storage managing terminal 10. A storage system manager (person) operates the storage managing terminal 10 and executes the reference and the change of the constructional information 310 by the above construction.

FIG. 2 shows one example of the constructional information. The constructional information 310, 210 is stored into the storage 30 and the storage managing server 20, respectively. This constructional information 310, 210 includes breakdown information 520, performance information 530, etc., that is independently updated by the storage system 30, as well as information set and changed from the storage managing server 20, such as volume information 510, etc.

Figure 3:
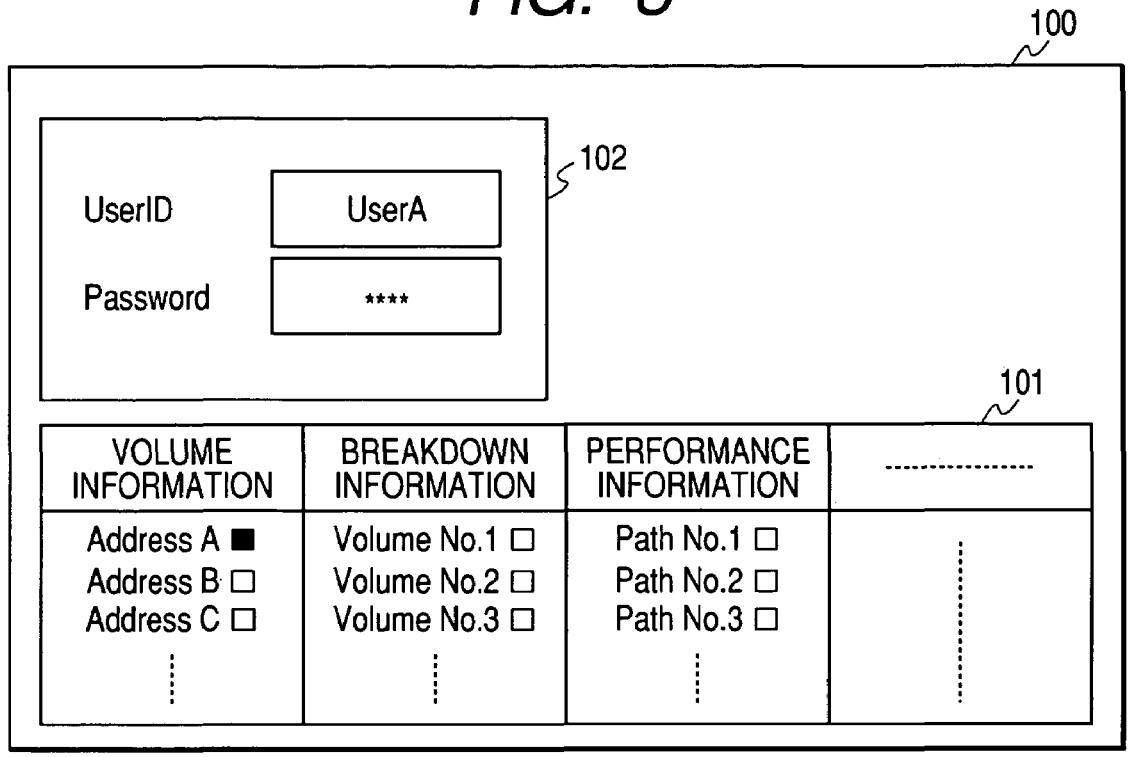
FIG. 3 is a diagram showing one example of a screen for login of a storage managing terminal and constructional information input transmission.

FIG. 3 shows one example of a screen 100 (hereinafter called an initial screen) for transmitting login and constructional information inputs of the storage managing terminal 10. When the storage managing terminal 10 powers up, a login input section 102 and a constructional information input section 101 are displayed, and the specifying of constructional information to be referred to and changed is requested together with the input of a user name and a password. In the constructional information input section 101, a state checked by the storage system manager is shown in the right-hand ☐ column of an address A. Thus, the storage system manager specifies the required constructional information and requests display of the constructional information from the storage managing server 20. A column for directly inputting a title of the constructional information, etc., also may be arranged to specify the constructional information.

Figure 4:
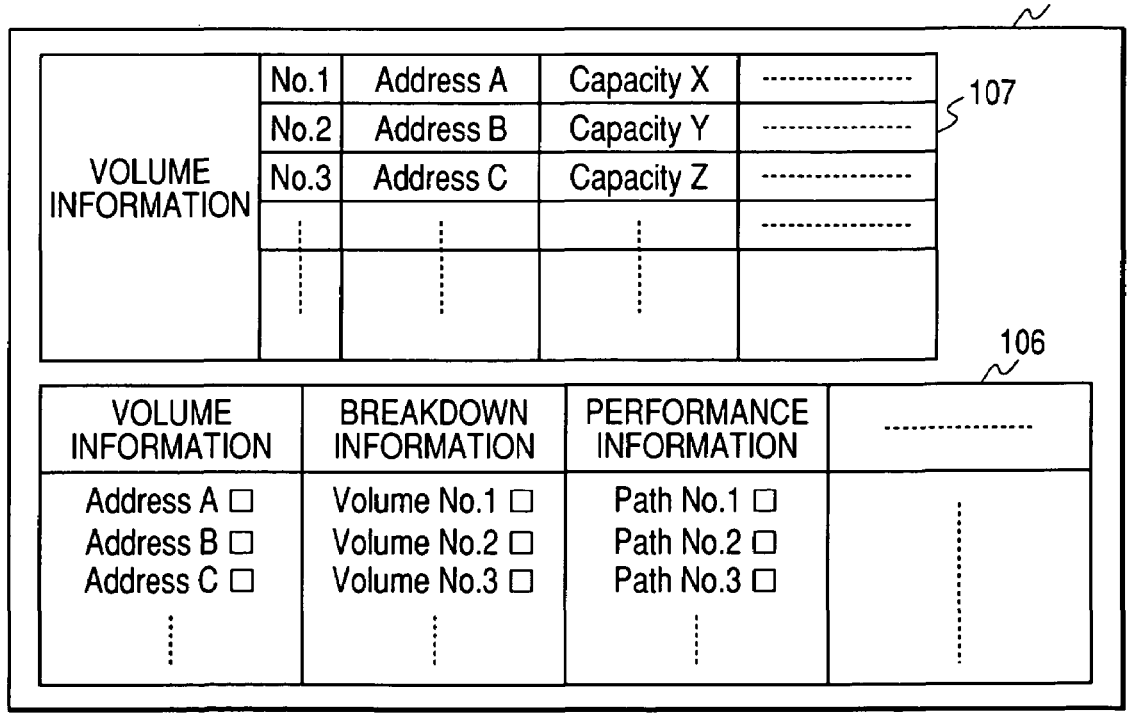
FIG. 4 is a diagram showing a constructional information display screen.

FIG. 4 shows a constructional information display screen 105. Reference numeral 107 designates a constructional information display section. The constructional information display section 107 shows a display when the storage system manager requests volume information as the constructional information. Similar to the constructional information input section 101, reference numeral 106 designates a constructional information input section. When the storage system manager wants to refer to still other constructional information, he/she performs a check in ☐ of an item column desirous to be referred to. For example, when new constructional information is referred to after the reference, setting, change, etc. of the volume information displayed in the constructional information display section 107 of FIG. 4, the storage system manager inputs and transmits a check in a predetermined desirable portion of this constructional information input section 106.

Figure 5:
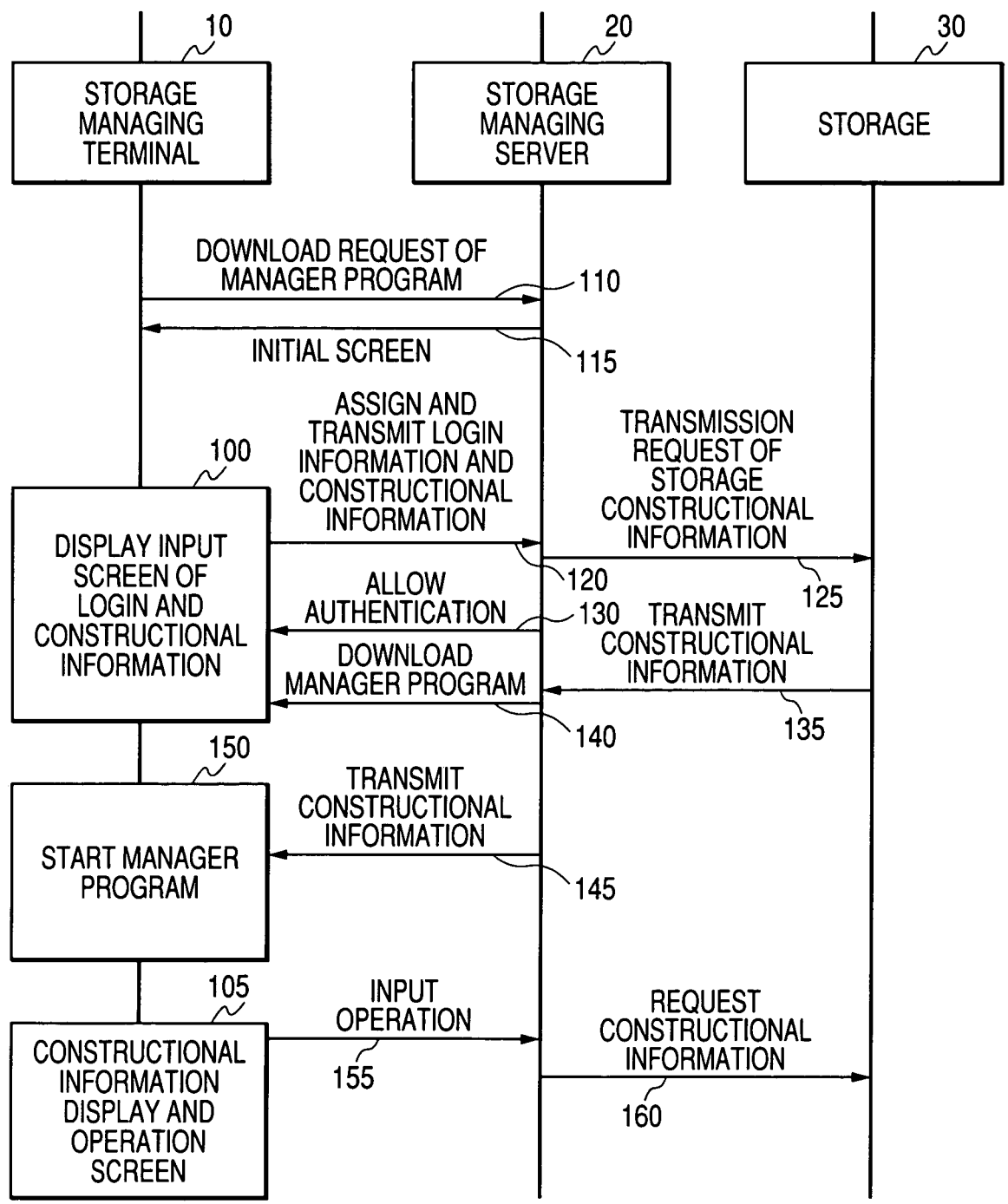
FIG. 5 is a process timing diagram showing the processing of the constructional information located in the storage system until this constructional information is displayed in the storage managing terminal.

FIG. 5 is a flow chart of the constructional information 310 as illustrated in FIG. 1, located in the storage system 30 until the constructional information 310 is displayed in the storage managing terminal 10. A download request of the manager program for the storage managing terminal 10 is made from the storage managing terminal 10 to the storage managing server 20 (110). The initial screen 100 is transmitted, as shown by reference numeral 115, from the storage managing server 20.

The storage system manager inputs a user name and a password through the login input section 102 of the initial screen 100 that is displayed in the storage managing terminal 10, and further specifies the item of predetermined constructional information that is to be displayed through the constructional information input section 101 and transmits this information to the storage managing server 20 (120). The storage managing server 20 receives the information inputted to the constructional information input section 101, as illustrated in FIG. 3, and requests the transmission of the constructional information 310 of the storage from the storage 30 (125).

Next, the storage managing server 20 issues login permission to the storage managing terminal 10 (130). After the login permission is issued, the storage managing server starts the downloading of the manager program (140).

Further, the storage managing server transmits the constructional information 310, transmitted (135) from the storage 30, to the storage managing terminal 10 (145). The storage managing terminal 10 then starts the downloaded manager program (150). The manager program is a program that is able to refer and set the constructional information of the storage, and it is formed by the applet of Java (Java is a registered trademark) and can be operated in a WWW browser. The manager program is stored in the storage managing server and is delivered to the storage managing terminal through the storage managing server.

When the manager program is started, the constructional information display-operation screen 105 is displayed in the storage managing terminal 10 and the storage system manager can perform an operation.

The constructional information assigned by the constructional information input section 101 of the initial screen 100 is displayed as the constructional information display section 107 on the screen at the login time. The constructional information input section 106 for assigning new constructional information is also displayed in this constructional information display section 107. When the obtained constructional information is referred to, set or changed, the referring, setting and changing operations are performed through the constructional information display section 107 on the screen 105, and an operation is inputted and transmitted to the storage managing server 20 (155). The storage managing server 20 receives information inputted by this operation and further transmits this information to the storage 30 (160).

Figure 6:
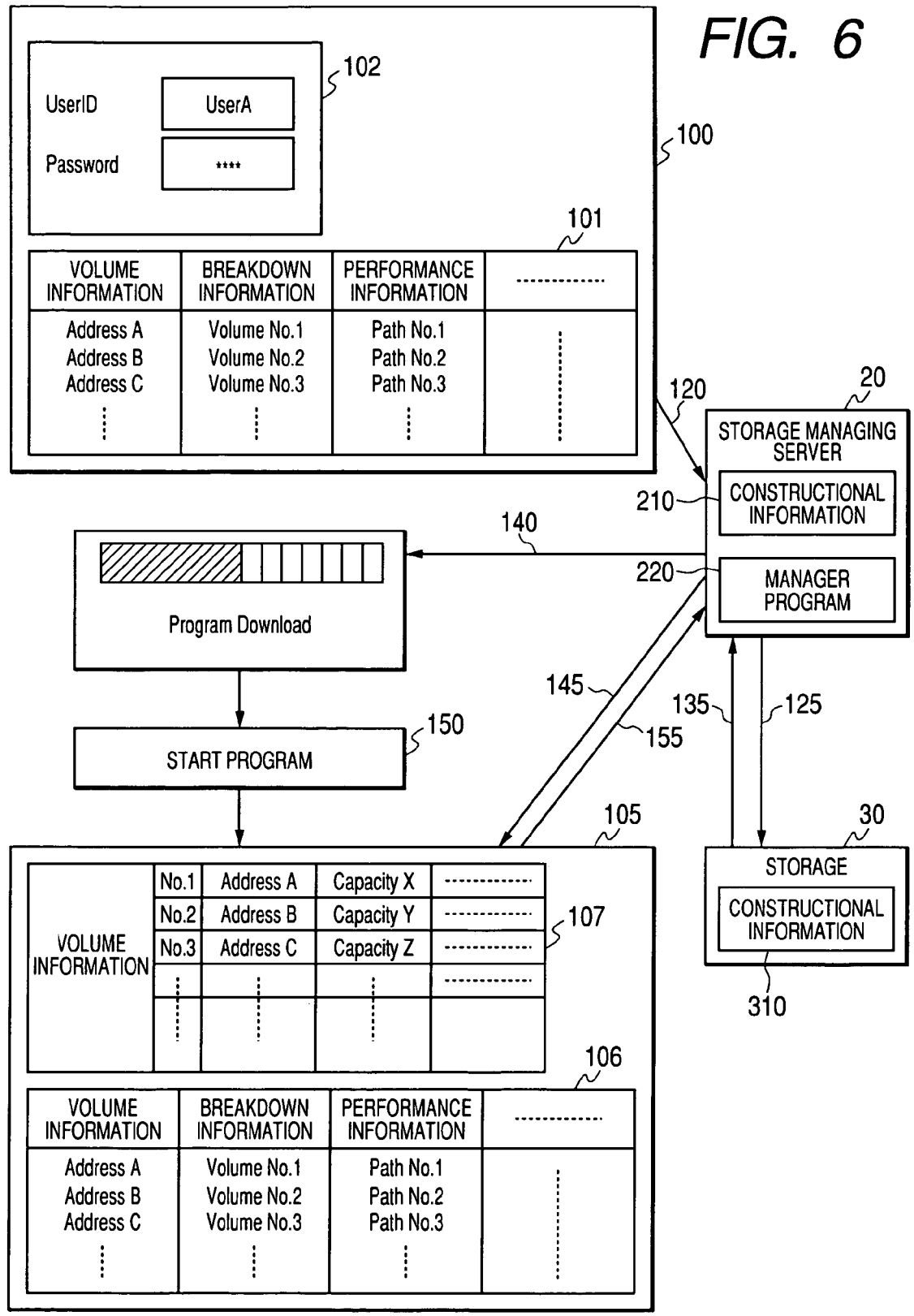
FIG. 6 is a diagram illustrating an example of the flow of FIG. 5.

FIG. 6 is a diagram showing an example of the flow of FIG. 5. When the assignment of the login information and required constructional information inputted through the screen 100 of the storage managing terminal 10 is transmitted to the storage managing server 20 (120), the storage managing server 20 performs judgment processing relating to the login permission and downloads the manager program for the storage managing terminal 10 (140). The storage managing server 20 issues a command (125) for requesting the transmission of the constructional information 310 of the storage 30 to the storage 30, and it obtains predetermined desirable constructional information from the storage 30 (135). The storage managing server 20 then stores the constructional information 310 of the storage 30 as constructional information 210 within the storage managing server 20. Further, the storage managing server 20 transmits the obtained constructional information to the storage managing terminal 10 (145).

On the other hand, the storage managing terminal 10 starts the downloaded manager program (150) and displays the constructional information received from the storage managing server 20 in the constructional information display section 107 of the constructional information display-operation screen 105.

As mentioned above, the constructional information input section, as shown by reference numeral 101, is arranged before the storage manager, who is operating the storage managing terminal 10, downloads the manager program to refer to, set, etc. the constructional information. Thus, while the manager program is by downloaded, the storage managing server 20 can obtain the constructional information 310 assigned by the storage system manager. Accordingly, it is possible to shorten the time (response time) from the start of the manager program to the display of the obtained constructional information in the storage managing terminal.

The processing of the storage managing terminal 10 will be explained with reference to FIG. 7. The storage managing terminal 10 requests the downloading of the manager program 220 for the storage managing terminal 10 stored into the storage managing server 20 from the storage managing server 20 (step 600). The download request is made by assigning the URL of the manager program. In the storage managing terminal 10, the initial screen 100 is displayed (step 610) and the storage system manager can perform an input for specifying login information and required constructional information.

Here, the constructional information input section 101, which serves as an input section for assigning the required constructional information by the storage system manager, is originally one portion of the manager program. However, in accordance with the present invention, this one portion is displayed in the timing of the login input section display. In other words, the manager program originally completed in authentication and delivered after the login is transmitted before the completion of the authentication. Thus, the storage managing server can carry out the task of obtaining the constructional information requiring time with respect to the storage device at an early stage in the processing.

As mentioned above, since the manager program relates to a change and a setting of the constructional information, no manager program should be executed by an unauthenticated person.

Therefore, in accordance with the present invention, the person using the terminal 10 can precedently input only the assignment of the constructional information which is to be displayed so that the operation by obtaining this information is hastened. On the other hand, the program portion with which it is possible to truly make a change is set so as to be downloaded after the authentication. The assignment of the login information and the constructional information inputted on the initial screen 100 is transmitted to the storage managing server 20 (step 620). Authentication result reception (step 630) and the authentication result from the storage managing server 20 are checked (step 640). When no authentication is indicated as a result of the check, the processing is terminated. In contrast to this, when the check result is OK, the manager program 220 is downloaded and started (step 650). The manager program 220 executes steps 660 to 700.

In the storage managing terminal 10, the constructional information requested in the step 610 is displayed in the constructional information display section 107, and the constructional information input section 106 is also displayed. The operating inputs of reference, setting, change, deletion and end of the constructional information are allowed with respect to the constructional information input section 106 (step 670). Reference processing 680, setting processing 690, change processing 700 and deletion processing 710 are executed in accordance with the operating inputs, and a new constructional information screen 105 is displayed (step 660).

Figure 7:
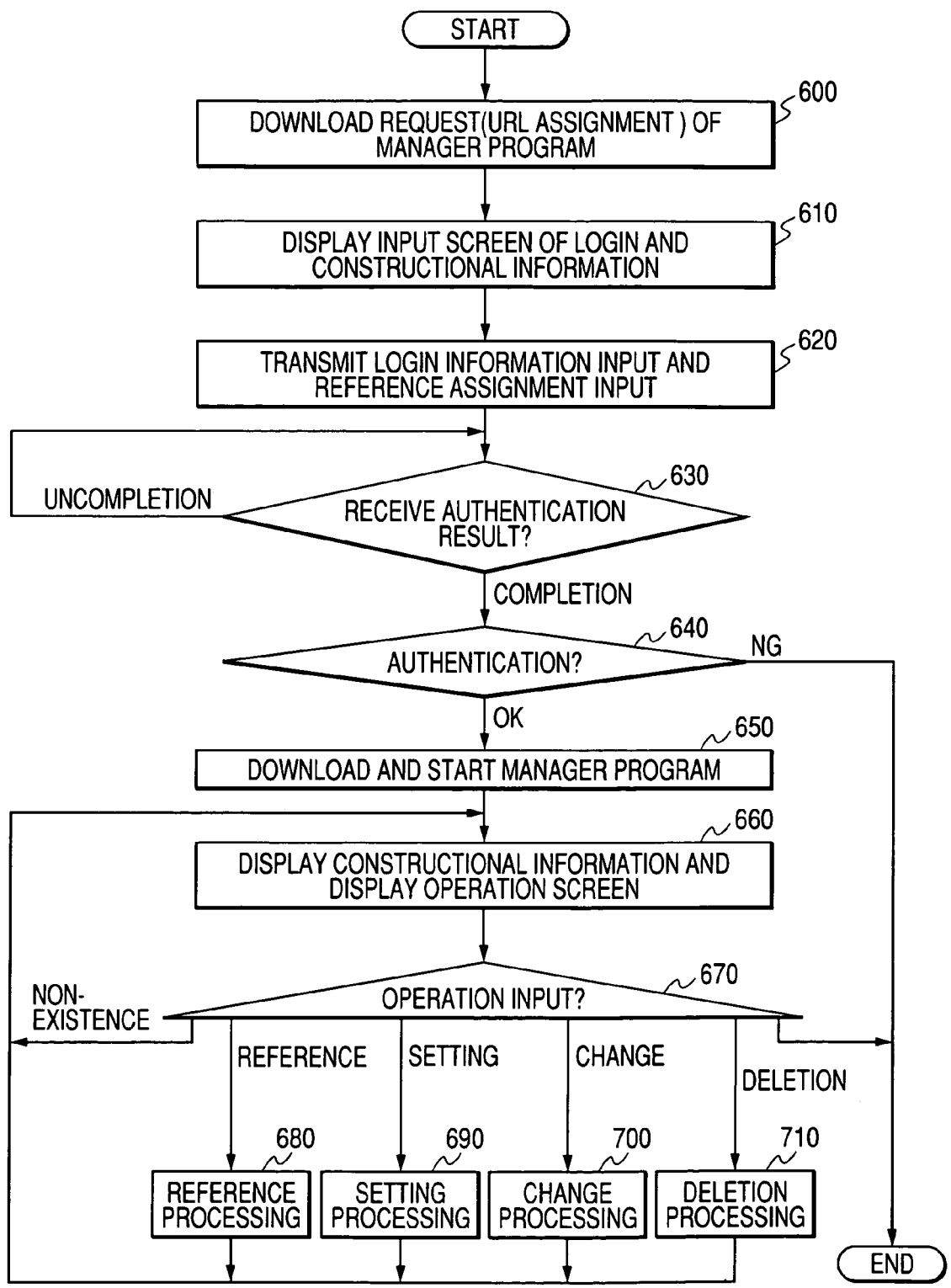
FIG. 7 is a flow chart of the processing of the storage managing terminal.

FIG. 8 shows a flow chart of the reference processing 680 as one example of the processing in FIG. 7. The constructional information newly referred to is inputted to the constructional information input section 106 of the storage managing terminal 10 (step 682), and a constructional information reference is requested from the storage managing server 20 (step 684). When the reception of the requested constructional information is completed (step 686), it is branched into the step 660.

FIG. 9 shows a flow chart of the change processing 700 in FIG. 7. The constructional information displayed in the constructional information display section 107 of the storage managing terminal 10 is changed (step 702), and new constructional information is requested and inputted (step 704), and changed constructional information is transmitted to the storage managing server 20 (step 706). A confirmation screen of the constructional information that has been changed by the change in the constructional information is then received (step 708). Thus, the new constructional information can be inputted and assigned in the constructional information input section 106 of the storage managing terminal 10.

Figure 10:
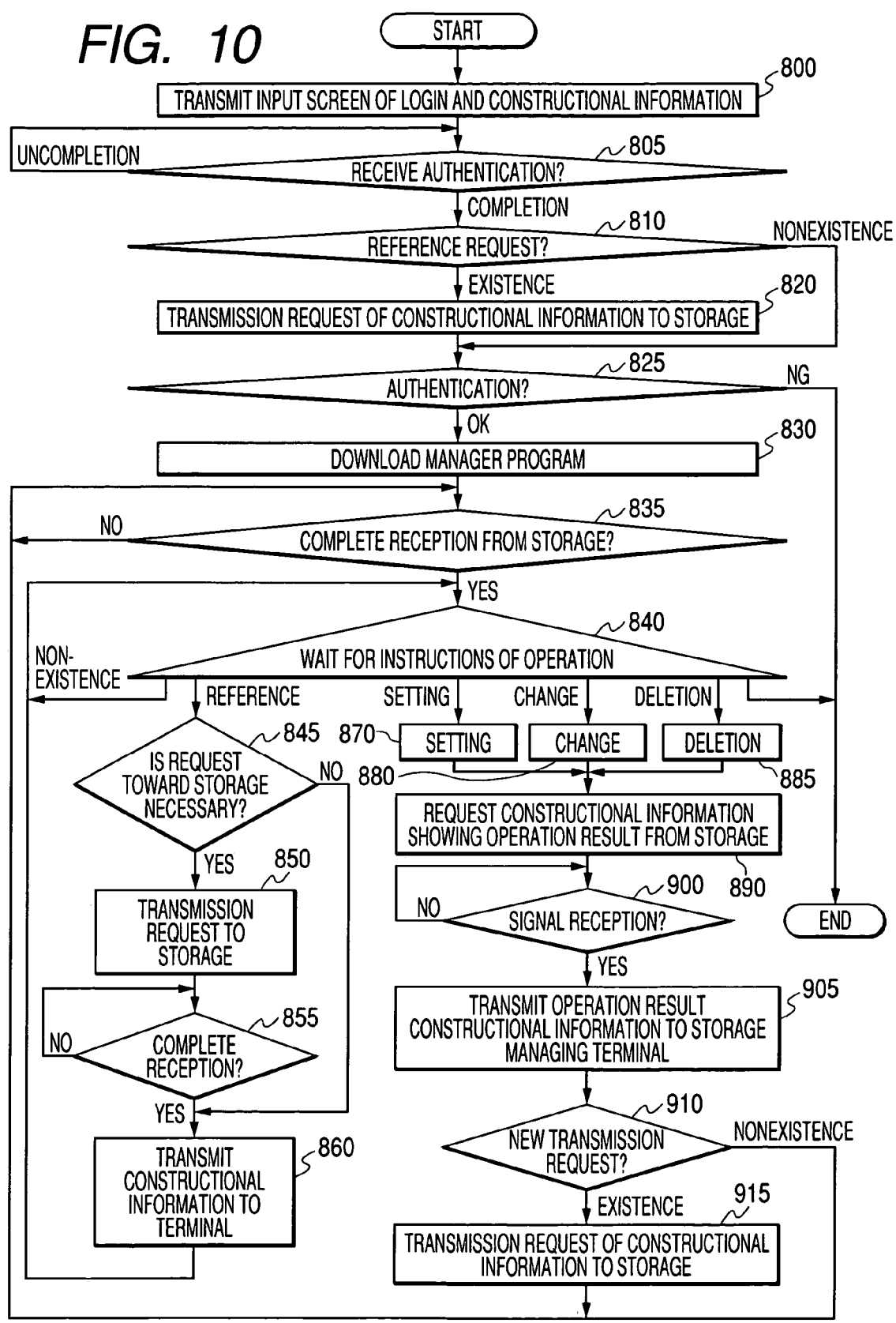
FIG. 10 is a flow chart showing the processing of a storage managing server.

FIG. 10 shows the processing of the storage managing server 20. The storage managing server 20 receives a download request of the manager program from the storage managing terminal 10, and it transmits the initial screen 100 to the storage managing terminal 10 (step 800). The storage managing server 20 then receives a user name and a password from the storage managing terminal 10 (step 805). When the constructional information reference is requested from the storage managing terminal 10 (step 810), the storage managing server 20 requests the transmission of the constructional information from the storage 30 (step 820). When authentication using the check of the user name and the password is OK (step 825), the manager program is downloaded (step 830). After the reception of the constructional information from the storage 30 is completed (step 835), the storage managing server 20 waits for operation instructions from the storage managing terminal 10 (step 840).

There are items, such as reference 845, setting 870, change 880 and deletion 885 of the constructional information, in the operation instructions. When the instructions of the reference are given and the request of the constructional information is necessary with respect to the storage 30 (step 845), the storage managing server 20 requests the transmission of the constructional information from the storage 30 (step 850) and waits for reception completion (step 855). When the signal reception is completed, the constructional information 210 stored to the storage managing server 20 is transmitted to the storage managing terminal 10 (step 860). When the operation instructions are one of the setting, the change and the deletion, the storage managing server 20 executes one of steps 870, 880 and 885 with respect to the storage 30 in accordance with these instructions. The storage managing server 20 then requests the constructional information showing an operation result from the storage 30 (step 890). When the storage managing server 20 receives this constructional information (step 900), the storage managing server 20 transmits the constructional information as the operation result to the storage managing terminal 10 (step 905). When there is a transmission request of new constructional information from the storage managing terminal 10 (step 910), the storage managing server 20 requests the transmission of the constructional information from the storage 30 (step 915). Thus, when there is a request of the reference of the new constructional information in coping with the storage managing terminal 10, the storage managing server 20 collectively executes this processing.

FIG. 11 shows the change processing 880 in FIG. 10. When the storage managing server 20 receives the change constructional information from the storage managing terminal 10 (step 882), the storage managing server 20 transmits the constructional information to the storage 30 to reflect this change in the constructional information 310 of the storage 30 (step 884).

In the explanation of this embodiment, the display and the function of the initial screen 100 have been described as one portion of the manager program. It is not necessary to collectively treat these programs as the manager program, and these programs also may be constructed by independent programs functionally divided and classified. Further, a program for the display of the initial screen 100 may be installed to the storage managing terminal in advance. Even when processing for obtaining the constructional information inputted by a managing person is login-authenticated, it is sufficient if execution is performed by the storage managing server.

As mentioned above, the invention has been concretely explained on the basis of an exemplary embodiment, but the present invention is not limited to the above-described embodiment. The present invention can be naturally modified in scope not departing from the features of the present invention.

What is claimed is:

1. A processing method for use in the operation of a storage managing server that is connected to a storage device and a storage managing terminal, said processing method comprising the steps of:
receiving, by the storage managing server, a first request, requesting download of a manager program, issued from said storage managing terminal, said manager program to be used by said storage managing terminal for executing processing on the storage managing server, and a second request for executing processing including conducting communication of constructional information, which includes volume information defining characteristics of a plurality of volumes included in said storage device, between said storage device and the storage managing server, said constructional information being used for managing said volumes included in said storage device; and
starting, by the storage managing server, processing, which includes at least sending a request to said storage device requesting constructional information, with respect to said second request, and receiving the constructional information transmitted from said storage device in response to the request, before the storage managing server transmits a response to said first request to said storage managing terminal,
wherein the storage managing server, before transmitting a response to said first request including downloading the manager program to said storage managing terminal, transmits the constructional information transmitted from said storage device to the storage managing terminal,
wherein the storage managing terminal, before downloading the manager program from the storage managing server, but after receiving the constructional information from the storage managing server, starts processing which includes displaying a constructional information display operation screen on a display device including the received constructional information, and
wherein said storage device includes said volumes each of which stores data sent from host computers via a network.

2. The processing method according to claim 1, wherein said first request includes a login request from said storage managing terminal to the storage managing server.

3. A storage managing server connected to a storage device and a storage managing terminal, comprising: a processor for performing processing,
wherein the storage managing server performs first processing which is executed in response to a first request requesting download of a manager program from said storage managing terminal requesting download of a manager program which is used by said storage managing terminal to execute processing on said storage managing server, and second processing which is executed in response to a second request from said storage managing terminal, and includes conducting communication of constructional information, which includes volume information defining characteristics of a plurality of volumes included in said storage device, between said storage device and the storage managing server, said constructional information being used for managing said volumes included in said storage device;
wherein the storage managing server starts said second processing, which includes at least sending a request to said storage device requesting constructional information, with respect to said second request, and receiving the constructional information transmitted from said storage device in response to the request, before a response to said first request is sent to said storage managing terminal;

wherein the storage managing server, before transmitting a response to said first request including downloading the manager program to said storage managing terminal, transmits the constructional information transmitted from said storage device to the storage managing terminal:

wherein the storage managing terminal, before downloading the manager program from the storage managing server, but after receiving the constructional information from the storage managing server, starts processing which includes displaying a constructional information display operation screen on a display device including the received constructional information; and wherein said storage device includes said volumes each of which stores data sent from host computers via a network.

4. The storage managing server according to claim 3, wherein said first processing includes the downloading of said manager program for operating the constructional information of said storage device.

5. A processing method for use in the operation of a storage managing terminal that is connected to a storage managing server which is connected to a storage device, said processing method comprising the steps of:

responding to a first request, requesting download of a manager program which is used by said storage managing terminal for executing processing on said storage managing server with respect to said storage device; and responding to a second request for executing processing, including conducting communication of constructional information, which includes volume information defining characteristics of a plurality of volumes included in said storage device, between said storage device and said storage managing server, said constructional information being used for managing said volumes included in said storage device, wherein said responding to said first request and responding to said second request are made such that processing of said second request, which includes at least sending a request to said storage device requesting constructional information and receiving the constructional information transmitted from said storage device in response to the request, is performed before a response to said first request from said storage managing server is sent, wherein before said responding to said first request including downloading the manager program to said storage managing terminal, transmitting the constructional information transmitted from said storage device to the storage managing terminal, wherein before downloading the manager program from the storage managing server, but after receiving the constructional information from the storage managing server, starting processing which includes displaying a constructional information display operation screen on a display device including the received constructional information, and wherein said storage device includes said volumes each of which stores data sent from host computers via a network.

6. The processing method according to claim 5, wherein said first request includes a login request.

7. A storage managing terminal connected to a storage managing server which is connected to a storage device, comprising: a processor for performing processing, wherein the storage managing terminal performs transmission processing for sending a first request, requesting download of a manager program, to said storage managing server, said manager program to be used by said storage managing terminal to execute processing on said storage managing server, and a second request for executing processing which is executed in response to the second request to said storage managing server, said processing executed in response to the second request includes conducting communication of constructional information, which includes volume information defining characteristics of a plurality of volumes included in said storage device, between said storage device and said storage managing server, said constructional information being used for managing said volumes included in said storage device;

wherein processing said second request, which includes at least sending a request to said storage device requesting constructional information and receiving the constructional information transmitted from said storage device in response to the request, is performed before the response to said first request from said storage managing server is sent;

wherein the storage managing server, before transmitting a response to said first request including downloading the manager program to said storage managing terminal, transmits the constructional information transmitted from said storage device to the storage managing terminal;

wherein the storage managing terminal, before downloading the manager program from the storage managing server, but after receiving the constructional information from the storage managing server, starts processing which includes displaying a constructional information display operation screen on a display device including the received constructional information; and wherein said storage device includes said volumes each of which stores data sent from host computers via a network.

8. The storage managing terminal according to claim 7, wherein said first request includes a login request.

9. A processing method of a storage managing system constructed by a storage managing server connected to a storage device, and a storage managing terminal connected to the storage managing server, said processing method comprising the steps of:

issuing, by said storage managing terminal, a first request, requesting download of a manager program, which is used by said storage managing terminal for executing processing on the storage managing server and a second request for executing processing including conducting communication of constructional information, which includes volume information defining characteristics of a plurality of volumes included in said storage device, between said storage device, and said storage managing server, said constructional information being used for managing said volumes included in said storage device, to said storage managing server; and upon said storage managing server receiving the first and second requests, starting, by said storage managing server, processing with respect to said second request, which includes at least sending a request to said storage device requesting constructional information and receiving the constructional information transmitted from said storage device in response to the request, before a response to said first request is transmitted to said storage managing terminal, wherein the storage managing server, before transmitting a response to said first request including downloading the manager program to said storage managing terminal, transmits the constructional information transmitted from said storage device to the storage managing terminal, wherein the storage managing terminal, before downloading the manager program from the storage managing server, but after receiving the constructional information from the storage managing server, starts processing which includes displaying a constructional information display operation screen on a display device including the received constructional information, and wherein said storage device includes said volumes each of which stores data sent from host computers via a network.

10. The processing method of the storage managing system according to claim 9, wherein said first request includes a login request.

11. A storage managing system comprising a storage managing server connected to a storage device, and a storage managing terminal connected to the storage managing server, wherein said storage managing terminal performs transmission processing for sending a first request, requesting download of a manager program to said storage managing server, said manager program to be used by said storage managing terminal to execute processing on said storage managing server, and a second request for executing processing including conducting communication of constructional information which includes volume information defining characteristics of a plurality of volumes included in said storage device by said storage managing server between said storage device and said storage managing server, said constructional information being used for managing said volumes included in said storage device;

wherein said storage managing server performs first processing executed in response to the first request from said storage managing terminal, and second processing which is executed in response to the second request from said storage managing terminal, and includes conducting communication of the constructional information of said storage device between said storage device and the storage managing server, wherein said second processing with respect to the second request from said storage managing terminal, including at least sending a request to said storage device requesting constructional information and receiving the constructional information transmitted from said storage device in response to the request, is started before said storage managing server sends a response to said first request to said storage managing terminal, wherein the storage managing server, before transmitting a response to said first request including downloading the manager program to said storage managing terminal, transmits the constructional information transmitted from said storage device to the storage managing terminal, wherein the storage managing terminal, before downloading the manager program from the storage managing server, but after receiving the constructional information from the storage managing server, starts processing which includes displaying a constructional information display operation screen on a display device including the received constructional information, and wherein said storage device includes said volumes each of which stores data sent from host computers via a network.

12. The storage managing system according to claim 11, wherein said first request includes a login request, and said first processing includes the downloading of said manager program for operating the constructional information of said storage device.

13. A processing method executed by a storage managing server in a storage managing system, the storage managing system including:

plural volumes each being where data sent from a host computer via a network is stored;

a storage managing device having constructional information which includes volume information defining characteristics of the volumes;

a storage managing terminal; and the storage managing server connected to the storage device and the storage managing terminal, the method comprising:

a first step of receiving, from the storage managing terminal, a first request for downloading a manager program used by the storage managing terminal to the storage managing terminal;

a second step of receiving, from the storage managing terminal, a second request for transmitting, to the storage managing terminal, the constructional information required for conducting the processing the storage managing terminal performs regarding the constructional information, and sending a request to the storage managing device requesting the constructional information and receiving the constructional information from the storage managing device before sending a response to said first request;

a third step of transmitting the constructional information relevant to the second to the storage managing terminal;

a fourth step of displaying, in the storage managing terminal, a constructional information display operation screen on a display device including the received constructional information; and a fifth step of downloading the manager program to the storage managing terminal after said third and fourth steps.

14. A processing method executed by a storage managing server in a storage managing system, the storage managing system including:

plural volumes each being where data sent from a host computer via a network is stored;

a storage device having constructional information which includes volume information defining characteristics of the volumes a storage managing terminal; and the storage managing server connected to the storage device and the storage managing terminal, the method comprising:

a first step of receiving, from the storage managing terminal, a first request, requesting download of a manager program used by the storage managing terminal to the storage managing terminal;

a second step of receiving, from the storage managing terminal, a second request for transmitting, to the storage managing terminal, the constructional information required for conducting the processing the storage managing terminal performs regarding the constructional information, and sending a request to the storage managing device requesting the constructional information and receiving the constructional information from the storage managing device before sending a response to said first request;

a third step of acquiring the constructional information relevant to the second request from the storage device, and transmitting the acquired constructional information to the storage managing terminal;

a fourth step of displaying, in the storage managing terminal, a constructional information display operation screen on a display device including the received constructional information; and a fifth step of downloading the manager program to the storage managing terminal after said third and fourth steps.

* * * * *